UNITED STATES PATENT OFFICE.

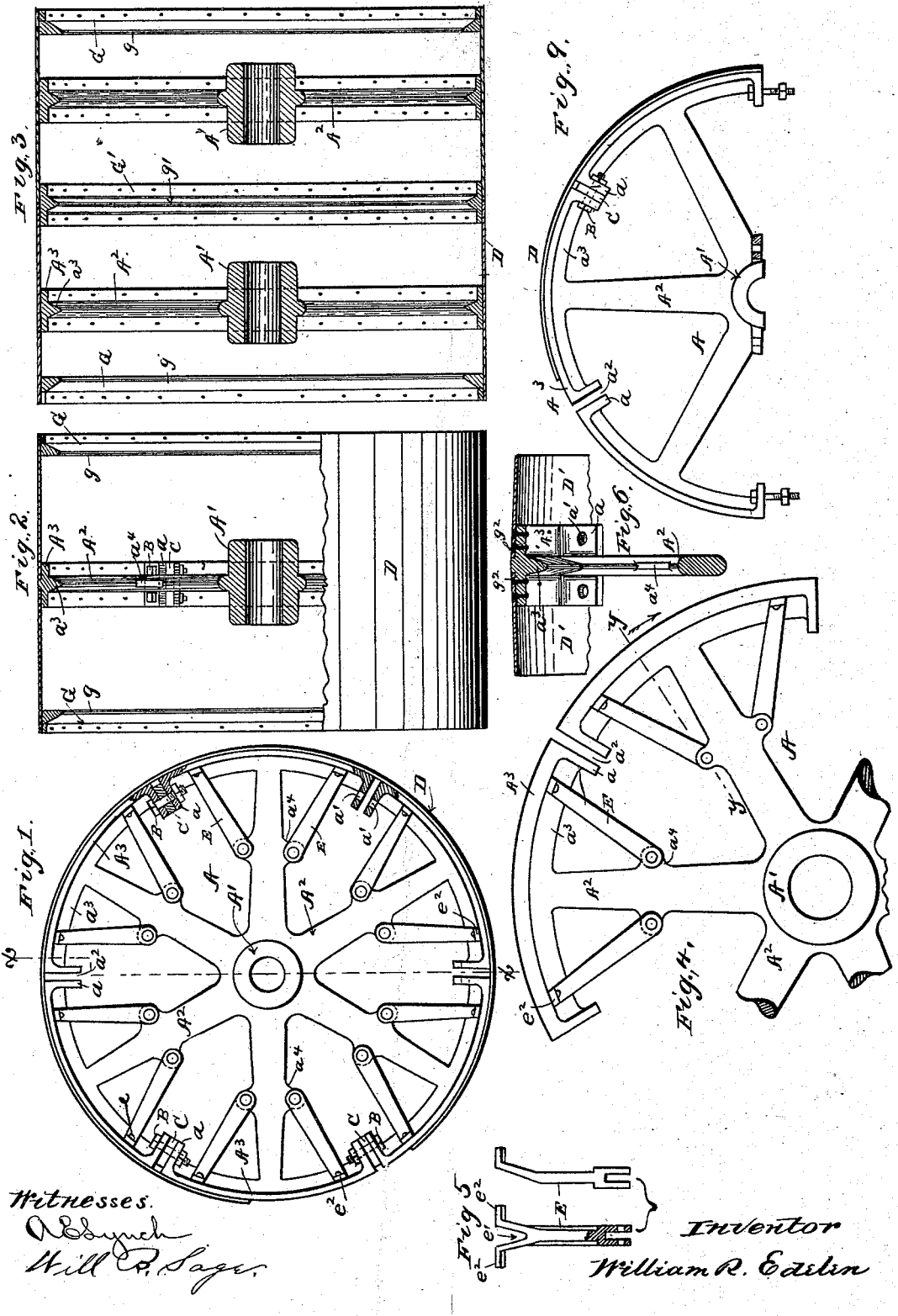

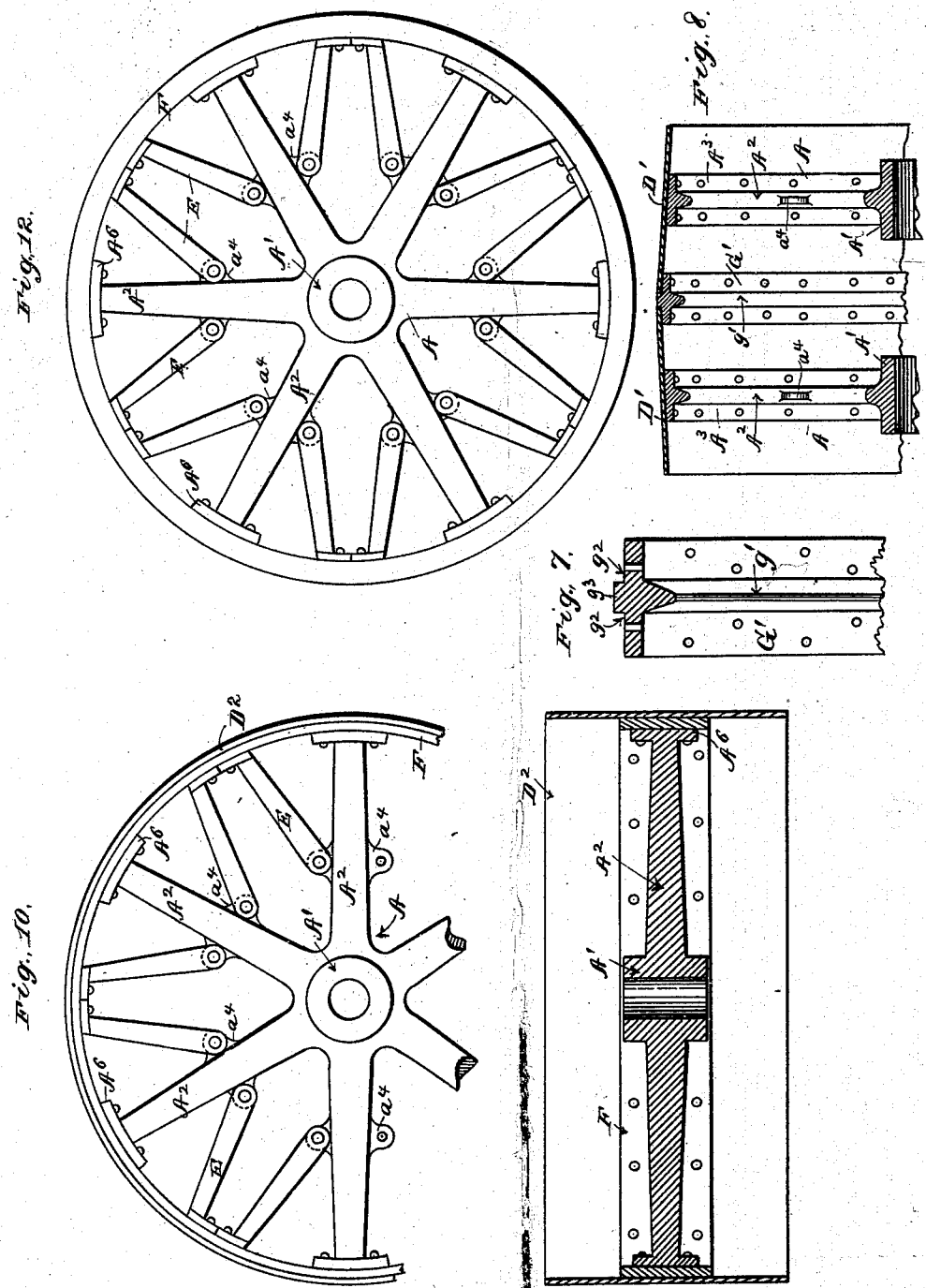

WILLIAM R. EDELEN, OF CLEVELAND, OHIO.

PULLEY.

SPECIFICATION forming part of Letters Patent No. 416,833, dated December 10, 1889.

Application filed June 26, 1889. Serial No. 315,675. (No model.)

*To all whom it may concern:*

Be it known that I, WILLIAM R. EDELEN, a citizen of the United States, residing at Cleveland, in the county of Cuyahoga and State of Ohio, have invented certain new and useful Improvements in Pulleys; and I do declare the following to be a full, clear, and exact description of the invention, such as will enable others skilled in the art to which it appertains to make and use the same, reference being had to the accompanying drawings, and to the letters of reference marked thereon, which form a part of this specification, in which—

Figure 1 is a side elevation of my improved pulley. Fig. 2 is a section on line $x\ x$, Fig. 1. Fig. 3 is a similar section to Fig. 2 with two pulleys joined by an annular ring. Fig. 4 is an enlarged view of Fig. 1 in detail. Fig. 5 is a detail of one of the struts or braces. Fig. 6 is a section of Fig. 4 on line $y\ y$. Fig. 7 is a detail in section of ring for securing two or more pulleys together. Fig. 8 is a similar view to Fig. 3 with the pulley-crowning. Fig. 9 is a side elevation of a split pulley in detail similar in construction to Fig. 1. Figs. 10, 11, and 12 are modifications.

My invention relates to improvements in pulleys in which the rim is cast in sections, each section being centrally located and integral with said arms and consisting of an arc flange of the arm aforesaid.

It also relates to the arms being cast integral with the hub and the aforesaid arc flanges and the radial lugs for securing said arc flanges together by bolts.

It also further relates to the arms being provided with lugs for attaching annular struts or braces for strengthening the rim.

It also further relates to the devices shown for securing two or more pulleys together by annular rings, and also for giving stiffness to the extreme edges of steel or wrought-iron rims by somewhat similar annular rings aforesaid.

It also further relates to the novel means for crowning a pulley of extreme width by joining two independent sheet-metal rims to a single cast pulley-rim, or to an annular ring with pulley-rim and spiders at the extremes of the sheet-metal covering.

The great objection to the present construction of pulleys having the rim and arms cast integral, and also the hub, is the liability of bursting from centrifugal force when running at high velocities. The bursting of pulleys is not owing to the centrifugal force becoming greater than the cohesive or tensile strength of the metal, but owing to irregularities in the casting, which are caused by unequal contraction and expansion during the process of cooling in the sand. These irregularities arise from tempering the sand, the humidity of which is unequally distributed, and also in saturating the sand too much at the parting preparatory to drawing the pattern, thereby chilling the metal and causing an unequal temperature. This varying temperature, when the entire pulley is cast integral, has a deleterious effect upon the metal, chilling the metal and contracting it quickly and producing internal cracks. perhaps, in several arms, and invariably near the rim, while other arms are expanded from causes aforestated, thus reducing the strength of the metal from sixty to seventy per cent., and the least shock of the belt at ordinary velocities will burst a pulley from centrifugal force.

With my improved pulley there is not that danger from unequal contraction and expansion, as the arc flanges cast integral with the arm do not constitute a solid rim, but is parted between each arm for the purpose of allowing each arm to contract or expand independent of each other, thereby giving the pulley the benefit of the full strength of the metal, and which it is utterly impossible to break through the centrifugal force parting the cohesive properties of the metal by any known velocities extant.

My improvements in pulleys consist of the spider A, which is composed of the following elements: hub A', arms A², and arc flanges A³, which are provided with lugs $a$, having holes $a'$ cast in them for receiving bolts B for securing the adjacent arc flanges together. The spaces $a^2$ between the adjacent independent arc flanges are filled by a block of metal or hard wood C preparatory to putting the pulley in the boring-mill for facing off the periphery to receive a steel or wrought-metal rim D, which is much wider than the cast-metal rim, for receiving a belt for the purpose of transmitting power.

The space between the contiguous arms of a pulley which is spanned by the rim is similar to an arch and its two abutments, as all loads upon the arch take the strain upon the arch to the abutments, and if they are not of sufficient strength they give way and cripple the arch. A similar result is accomplished with a pulley of weak construction, as the pull of the belt is upon the rim of the pulley, and any sudden shocks or jars are carried to the arms, which will break when extremely heavy work is required. To obviate this danger, I employ struts or braces E, which are pivoted at one end to a lug $a^4$, forming part of arm $A^2$, and secured at the other end by rivets $e$ to the arc flanges $A^3$. The braces are bifurcated at $e'$, so as to envelop the annular rib $a^3$ and secure a firm bearing for riveting the feet $e^2$ on the arc flanges aforesaid. It is not absolutely necessary to have the struts or braces secured on both sides of the rib $a^3$, as one of the legs of the braces (shown in Fig. 5) can be detached at the bifurcating-point, and the remaining leg, which will be a continuation of the brace proper, can be secured by a rivet or its equivalent.

When it is desired to utilize the combined elements of a pulley and fly-wheel, the arc flange $A^3$ can be dispensed with or modified, as shown at $A^6$, Figs. 10 and 12, and a heavy rim F substituted with a metallic covering $D^2$ of steel or iron for receiving a belt, or the heavy rim aforesaid can be utilized solely for a fly-wheel, as shown in Fig. 12, and the sheet-metal pulley-covering dispensed with.

The sheet-metal covering D is provided with annular rings G, having depending ribs $g$. These rings are riveted to the rim near their edges, as shown in Figs. 2 and 3, or they can be put in any position, acccording to circumstances. These rings serve a double purpose. They stiffen the pulley when extremely tight and heavy belts are employed, and for ordinary work a much lighter rim D can be used, as these rings will prevent the rim from sagging or springing, especially from sudden shocks.

When it is required to make a straight-faced pulley of extreme width, I employ an annular rib-ring G' for connecting two or more pulleys together. This ring has annular rib $g^3$ and rabbets $g^2 g^2$ turned on opposite sides, which serve as a shoulder for the pulley-rim D' when riveting the same to said ring, as shown in Figs. 3 and 7.

When it is required to make a long drum, I take the spiders A A, as shown in Fig. 3, and spread them apart according to the width of the drum required, and then rivet any number of rings G' to join the various sections D' for making the drum, similar to the means employed in riveting rings G', as shown in Fig. 3.

The ordinary means for crowning a pulley for preventing a belt from slipping off is to pass the sheet metal between rolls male and female—that is, one roller being concave and the opposite roll convex—which stretches the metal in the center of the sheet. With my improved means I take two narrow sheet-metal rims and rivet their edges to the annular ring G' aforesaid, and use two spiders A A, as shown in Fig. 8. For a pulley of ordinary width I merely turn the rabbets tapering on the rim to suit the crowning of the pulley and rivet the separate sheets on, as shown in Fig. 6. Preparatory to riveting the two sheets on the rim aforesaid the rim for a crowning-pulley must be trimmed before or after the sheets are passed between the rolls, so as to make the edges of the sheet parallel before riveting on the rim.

What I claim is—

1. A pulley having independent arc flanges or sections of a rim integral with the arms and hub, with annular struts pivoted to lugs integral with the arms at one end and the opposite ends of said struts secured to said arc flanges of the pulley-rim, and said rim having a sheet-metal covering suitable for receiving a belt, as shown and described.

2. A pulley having independent arc flanges or sections of a rim integral with the arms and hub, annular struts pivoted to lugs and their opposite ends secured to said arc flanges of the pulley-rim, having a metallic covering, and annular brace-rings for strengthening a sheet-metal covering, substantially as shown and described.

3. A pulley having independent arc flanges or sections of a rim integral with the arms and hub, and radial lugs and blocks between them adapted to be bolted to said lugs, as shown and described.

4. A pulley provided with an annular ring G' joining several sections together, and rings G G, adapted to be put at the extremes of a pulley, substantially as shown and described.

5. In a pulley, substantially as shown, the combination of the following elements: spider A, composed of hub A', arms $A^2$, provided with lugs $a^4$, and arc flanges or section of a rim $A^3$, having radial lugs $a$ and holes $a'$, substantially as shown and described, and block C, filling spaces $a^2$, and bolts B, as shown and specified.

6. In a pulley, substantially as shown, the combination of the following elements: struts or braces E, pivoted to arms $A^2$, having arc flanges $A^6$, at one end and the opposite ends secured to a rim F, adapted to receive a pulley covering or rim $D^2$.

In testimony whereof I affix my signature in presence of two witnesses.

WILLIAM R. EDELEN.

Witnesses:
ALBERT E. LYNCH,
WILL B. SAGE.